Sept. 22, 1959 E. S. COOK 2,905,199
FLUID PRESSURE ACTUATOR
Filed Dec. 28, 1953

INVENTOR.
Earle S. Cook
BY
Adelbert A. Steinmiller
ATTORNEY

United States Patent Office 2,905,199
Patented Sept. 22, 1959

2,905,199

FLUID PRESSURE ACTUATOR

Earle S. Cook, Forest Hills, Pa., assignor to Westinghouse Air Brake Company, Wilmerding, Pa., a corporation of Pennsylvania Application December 28, 1953, Serial No. 400,741

2 Claims. (Cl. 137—782)

This invention relates to fluid pressure actuators and more particularly to fluid pressure actuators of the kind adapted to move in opposite directions from a neutral position responsively to oppositely directed fluid pressure differentials.

In the ordinary type of fluid pressure actuators an actuating member such as a flexible diaphragm is employed in such a manner that the amount of fluid pressure differential required to develop a force sufficient to move it in one direction is the same as the amount of fluid pressure differential required to develop force sufficient to move it in the opposite direction.

In certain types of apparatus and under certain operating conditions it is desirable and some times required that movement of the actuating member in one direction from the neutral position occur upon one fluid pressure differential and movement thereof in the opposite direction from the neutral position occur upon a different fluid pressure differential.

The principal object of my invention is to provide a fluid pressure actuator employing a single flexible diaphragm and characterized by means for causing the diaphragm to move in one direction in response to a certain fluid pressure differential force and in the opposite direction in response to a different fluid pressure differential force.

Another object of my invention is to provide a fluid pressure actuator of the type indicated in the foregoing object and characterized by means for causing the flexible diaphragm to have different effective pressure areas for opoposite directions of movement thereof.

Figure 1:
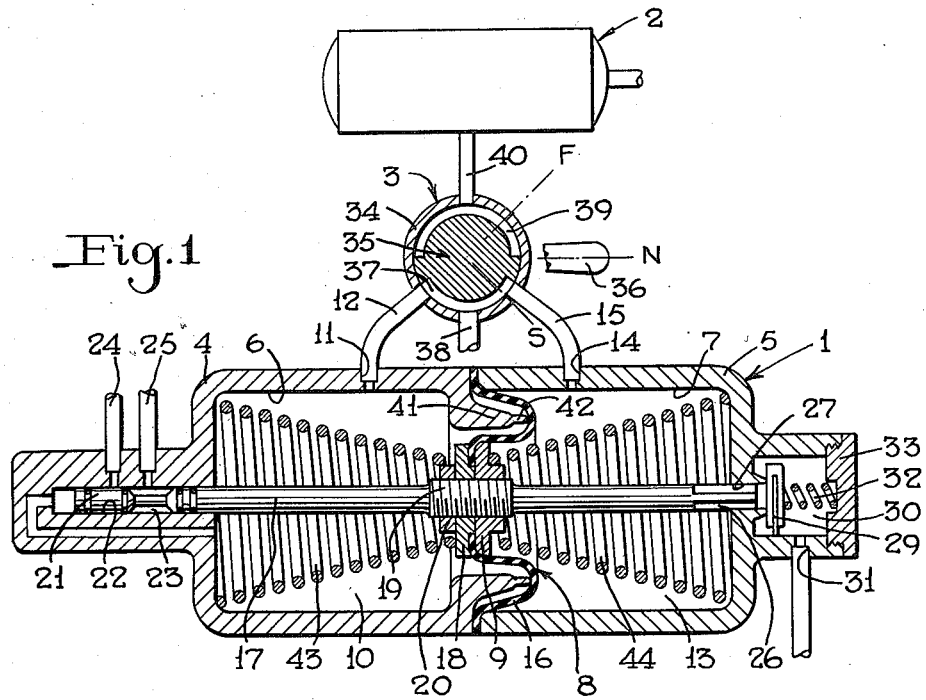
Figure 2:
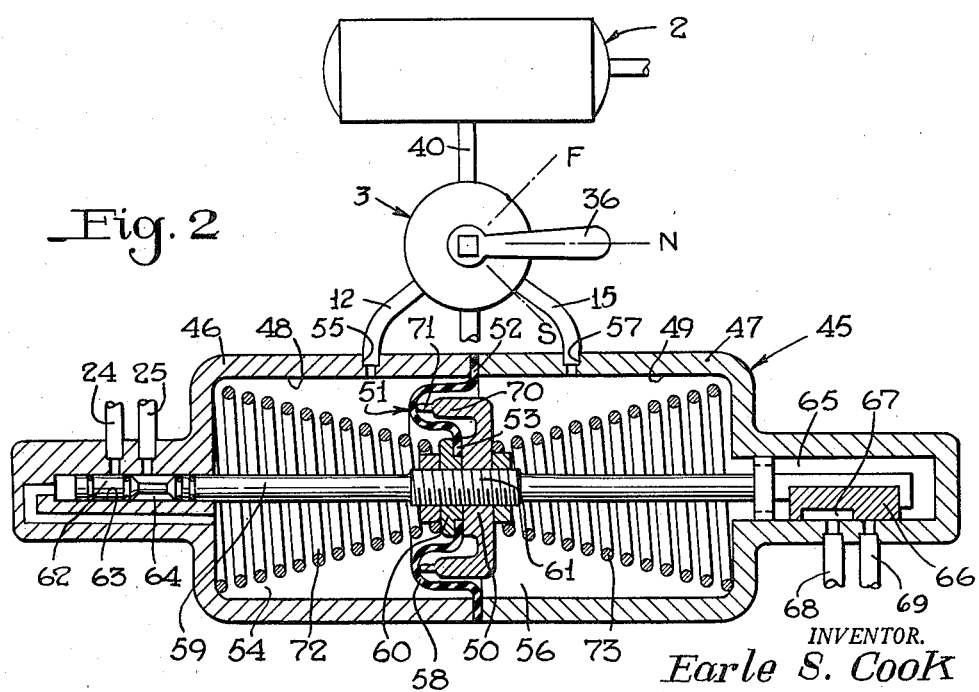

Other objects and advantages of the invention will appear in the following more detailed description thereof when read in connection with the accompanying drawings, in which Fig. 1 is a sectional view of a fluid pressure actuator device, showing one embodiment of my invention, with the flexible diaphragm and follower shown in their normal position of rest, and Fig. 2 is a view, partly in section and partly in outline, of a fluid pressure actuator device, showing a modification of my invention with the flexible diaphragm and follower shown in their normal position of rest.

The term "effective pressure area" as herein used, connotes that area which is obtained by dividing the force actually developed by a diaphragm-and-follower type fluid pressure motor by the unit fluid pressure supplied. When, as in the structures hereinafter described, a diaphragm is clamped about its outer edge between portions of a stationary member, such as a valve casing, part of the force exerted by fluid under pressure on the diaphragm type fluid pressure motor will be transmitted to the stationary member and thus not all of such force will be effective for moving the diaphragm and follower; whereas with piston type fluid pressure motors all of the force (less any friction drag) exerted by fluid pressure on the piston is effective for moving it because the piston is movable relative to the casing bore. The ratio between the "effective pressure area" and the actual area of the diaphragm and follower would thus represent the efficiency of the diaphragm and follower. The efficiency of a fluid pressure motor of the diaphragm and follower type has been found to be proportional to the ratio of the effective area of the follower to the effective area of the diaphragm and follower; and hence the larger the effective area of the follower in relation to that of the diaphragm, the higher the efficiency of this type of fluid pressure motor. Thus, if the diaphragm is more efficient in one direction than in the opposite direction, it will move in said one direction responsively to a lower fluid pressure force than is required to move it in the opposite direction.

According to the present invention, there is provided a novel fluid pressure motor or actuator of the diaphragm and follower type having novel means whereby different effective pressure areas and hence different efficiencies will be obtained according to whether the motor is shifted in one direction or the opposite direction.

*Description of Fig. 1*

For illustrative purposes only, I have shown my invention according to this embodiment as being applied to a fluid pressure actuated valve device 1, operation of which is effected by fluid under pressure supplied from a normally charged reservoir 2 by the manual operation of a valve device 3.

The fluid pressure valve device 1 comprises a casing section 4 secured to a casing section 5 in any suitable manner, said casing section 4 having formed therein a bore 6 coaxially arranged with a bore 7 formed in casing section 5.

Secured in the casing formed by the sections 4 and 5 is a movable abutment comprising an annular flexible diaphragm 8 and a follower 9 that is suitably secured to the central portion of the diaphragm 8.

The flexible diaphragm 8 has a flat outer peripheral portion clamped between the casing sections 4 and 5 and a flat inner peripheral portion secured to the follower 9 as hereinafter more fully described. Formed at one side of diaphragm 8 is a chamber 10 which is connected to the valve device 3 by way of a passage 11 formed in the casing section 4 and a pipe 12, and formed at the opposite side of diaphragm 8 is a chamber 13 which is connected to said valve device 3 by way of a passage 14 in the casing section 5 and a pipe 15.

The portion of the diaphragm 8 which is intermediate the flat outer and inner peripheral portions thereof is in the form of an annular flexible corrugation or fold 16 of substantially U-shape.

Disposed centrally within the casing sections 4 and 5 and extending coaxially therethrough is an actuating rod 17, the rod extending through the central opening in the diaphragm 8 and having the inner peripheral portion of the diaphragm 8 operatively attached thereto, as by clamping said portion of the diaphragm 8 between the follower 9 and a clamping nut 18. The rod 17 has a central threaded portion 19 on which the follower 9 and nut 18 screw. A lock nut 20 is provided for locking the nut 18 in clamping position.

The left-hand end of rod 17 is formed as a cylindrical valve element 21 which operates slidably in a bore 22 in casing section 4. An annular exterior groove 23 in valve element 21 serves to control communication between a pipe 24 and a pipe 25 connected to the casing section 4.

The right-hand end of rod 17 has formed thereon a fluted portion 26 slidably mounted in a bore 27 and adapted upon movement of rod 17 in a right-hand direction, as viewed in Fig. 1, to operably engage and unseat a check valve 29 disposed in a spring chamber 30 of casing section 5, said spring chamber 30 being continually open to a passage 31 in casing section 5. The check valve 29 is biased to seated position on an annular valve seat surrounding bore 27 by a spring 32 disposed in spring chamber 30 and retained therein by a cap screw 33. When the check valve 29 is raised from its seat, as hereinafter explained, fluid under pressure in passage 31 will flow to chamber 13 by way of spring chamber 30 and bore 27.

The valve device 3 may comprise a casing 34 in which is rotatably mounted, in any suitable manner, a plug valve element 35 which may be rotated by a handle 36 attached thereto from a neutral position in which it is shown and designated with the letter N, as viewed in Fig. 1, to either of two positions on opposite sides of the neutral position and respectively designated by the letters F and S.

As seen in Fig. 1, the valve element 35 has a cavity 37 formed therein which in the neutral position N of the valve element 35 connects the pipes 12 and 15 leading from the chambers 10 and 13 respectively, to an atmospheric passage or port 38 formed in the wall of casing 34. Thus with the valve element 35 in its neutral position N, fluid under pressure in chamber 10 may flow therefrom through passage 11 and pipe 12 to cavity 37 and thence to atmosphere by way of the port 38. Similarly in this neutral position N of the valve element 35 fluid under pressure in chamber 13 may flow therefrom through passage 14 and pipe 15 to cavity 37 and thence to atmosphere by way of port 38. Valve element 35 also has a cavity 39 formed therein, the purpose of which will be explained hereinafter.

If the handle 36 is rotated in a counter-clockwise direction, as viewed in Fig. 1, from its neutral position N to position F, the cavity 39 in valve element 35 is rotated to connect a pipe 40 leading from the rservoir 2 to the pipe 12 leading from chamber 10 thereby allowing fluid under pressure in reservoir 2 to flow to chamber 10 of the valve device 1 by way of the pipe 40, cavity 39, pipe 12 and passage 11. At the same time the cavity 37 is rotated in a counter-clockwise direction out of communication with pipe 12 to a position in which the chamber 13 is in communication with the atmosphere, by way of passage 14, pipe 15, and cavity 37.

When the handle 36 is shifted from its neutral position N in a clockwise direction to its position S, the cavity 39 conects the pipe 40 to pipe 15 leading to chamber 13 and at the same time cavity 37 is disconnected from pipe 15 while continuing to connect the chamber 10 to atmosphere by way of atmospheric port 38.

According to my invention, casing section 4 has formed thereon in coxial relation to bore 6 an annular extension 41 which projects into the hollow formed by the fold 16 of diaphragm 8. At the end of the extension 41 is an annular rib or bead 42 adapted to engage the inside crown of fold 16 along a substantially line contact.

This annular bead 42 is so positioned that it just contacts the inside crown of the fold 16 when the follower 9 is in its normal position of rest, that is its neutral position in which it is shown in Fig. 1. Two conical springs 43 and 44 disposed on opposite sides of diaphragm 8 in the chambers 10 and 13 respectively, act to yieldingly bias or center diaphragm 8 in its neutral position and to assist in returning the diaphragm 8 thereto upon displacement therefrom.

Operation of Fig. 1

Let it be assumed that the reservoir 2 is charged with fluid under pressure and that the valve device 3 is in its neutral position N with the various parts of the valve device 1 positioned as shown in Fig. 1, the chambers 10 and 13 in the valve device 1 being vented to atmosphere, as above described.

If it is desired to vent fluid under pressure from a device (not shown) which is connected to passage 31 of valve device 1, the operator rotates the handle 36 of valve device 3 in a counterclockwise direction, from neutral position N to position F. Fluid under pressure is accordingly supplied from reservoir 2 to chamber 10 and chamber 13 remains connected to atmosphere in the manner heretofore described.

As the fluid pressure in chamber 10 builds up, the inside of the fold 16 is deflected out of engagement with the bead 42, thereby exposing the entire inside area of fold 16 to the fluid under pressure in chamber 12. In this situation, fluid under pressure will of course act over the unclamped part of diaphragm 8 and substantially the full area of the follower assemblage 9, 18, 20; and the effective pressure area of the diaphragm 8 and follower corresponds to the area of a circle having a diameter which is substantially the average between the diameter of the bores 6 or 7 and the outer diameter of the follower 9.

Due to this force acting in the right-hand direction, the follower 9 and the rod 17 will be actuated in the right-hand direction against the opposing force of spring 44 causing the fluted portion 26 of rod 17 to raise the check valve 29 from its seat, in the manner previously described. With the check valve 29 unseated, fluid under pressure in the device (not shown) connected to passage 31 will flow to atmosphere by way of passage 31, chamber 30, past the raised check valve 29 and fluted portion 26 of rod 17 to chamber 13 and thence to atmosphere through passage 14, pipe 15, cavity 37 and passage 38.

When it is desired to terminate the venting to the atmosphere of fluid under pressure from the device (not shown), the handle 36 of valve device 3 is rotated in a clockwise direction, as seen in Fig. 1, from position F to neutral N in which the chambers 10 and 13 will then be simultaneously connected to the atmosphere, as above described. As the pressure of fluid in chamber 10 is reduced to atmospheric pressure, the spring 44 moves the follower 9 and diaphragm 8 in a left-hand direction to the neutral position in which it is shown in Fig. 1. Check valve 29 will then be reseated by the spring 32, thereby closing communication between spring chamber 30 and chamber 13 and cutting off further venting of fluid under pressure through passage 31 from the device (not shown) to which it leads.

If it is desired to connect pipe 24 with pipe 25 for any desired purpose, the handle 36 of valve device 3 is rotated in a clockwise direction, as viewed in Fig. 1, from neutral position N to position S, thereby supplying fluid under pressure to chamber 13 while chamber 10 remains vented to atmosphere.

As the fluid pressure builds up in chamber 13, the middle of fold 16 will be flexed tightly against the annular bead 42. It will accordingly be seen that only the area of diaphragm 8 and follower 9 inside the line of contact of fold 16 with bead 42 will be responsive to fluid under pressure in chamber 13 for moving the follower 9 in a left-hand direction. In this situation the effecitve pressure area of diaphragm 8 and follower 9 corresponds to the area of a circle having substantially a diameter which is the average between the diameter of the bead 42 and the outer diameter of follower 9. With the smaller effective pressure area of the diaphragm 8 and follower 9 thus available, a higher unit fluid pressure differential in chamber 10 over that in chamber 13 is thus required to move the follower 9 in the left-hand direction than for movement in the right-hand direction. When this higher unit fluid pressure differential develops, the follower 9 is moved responsively in the left-hand direction to the position in which valve 21 connects pipes 24 and 25.

Upon restoration of the handle 36 to neutral position N, fluid under pressure in chamber 13 is vented to atmosphere, in the manner hereinbefore described, thereby allowing the spring 43 to return the follower 9 and diaphragm 8 to their neutral position, and shifting valve 21 to its position for cutting off the connection between pipes 24 and 25.

Description of Fig. 2

Referring to Fig. 2, a modified fluid pressure actuated valve device 45 is illustrated which is controlled by the manual operation of the valve device 3 in the same manner as the valve device 1 in Fig. 1. For convenience of description parts in Fig. 2 corresponding to those in Fig. 1 will be identified by the same reference numerals, and only differences in structure of the embodiment of Fig. 2 will be described.

The fluid pressure actuated valve device 45 comprises a casing section 46 secured to a casing section 47 in any suitable manner. Formed in the casing section 46 is a bore 48 coaxially arranged with a bore 49 formed in casing section 47.

Contained within the casing formed by sections 46 and 47 is a movable abutment comprising a follower 50 and a flexible diaphragm 51.

The flexible diaphragm 51 has a flat outer peripheral portion 52 clamped between the casing sections 46, 47 and a flat inner peripheral portion 53 secured to the follower 50 as hereinafter described. Formed at one side of the diaphragm 51 is a chamber 54 which is connected to valve device 3 by way of a passage 55 formed in the casing section 46 and the pipe 12, and formed at the opposite side of the diaphragm 51 is a chamber 56 which is connected to said valve device 3 by way of a passage 57, formed in casing section 47, and the pipe 15.

The portion of the diaphragm 51 which is intermediate the flat portions 52 and 53 is in the form of an annular flexible corrugation or fold 58 similar to fold 16 of diaphragm 8 of Fig. 1.

Disposed centrally within the casing sections 46 and 47 and extending coaxially therethrough is an actuating rod 59, the rod extending through the central opening in diaphragm 51 and having the inner peripheral portion 53 of the diaphragm 51 operatively attached thereto, as by clamping the portion 53 of the diaphragm 51 between the follower 50 and a clamping nut 60. The rod 59 has a central threaded portion 61 on which the follower 50 and nut 60 screw. A lock nut is provided for locking the nut 60 in clamping position.

The left-hand end of rod 59 is formed as a cylindrical valve element 62 which operates slidably in a bore 63 in casing section 46. An annular exterior groove 64 in valve element 62 serves to control communication between pipes 24 and 25 exactly as does valve element 21 of valve device 1.

The right-hand end of rod 59 extends into a chamber 65 of casing section 47 and is suitably notched to receive a slide valve 66 which operates on a cooperating valve seat formed in said casing section 47.

This slide valve 66 has a cavity 67 which in its normal position, as viewed in Fig. 2, is in sole communication with a passage and pipe 68 for a desired control purpose. Upon movement of the slide valve 66 in a right-hand direction from its normal position to a second position, the cavity 67 will be moved into a position to connect passage and pipe 68 with another passage and pipe 69 for a desired control purpose.

In accordance with my invention, there is formed preferably integrally with the outer peripheral portion of the follower 50 an annular extension or a cylinder 70 which projects into the hollow of the fold 58, the end of the cylinder 70 having an annular rib or bead 71 formed thereon. The arrangement of the diaphragm 51 and follower 50 is such that the bead 71 lightly contacts the inside crown of fold 58 along a substantially line contact while the diaphragm 51 is in its neutral position in which it is shown in Fig. 2.

Two conical springs 72 and 73 disposed in chambers 54 and 56, respectively, serve to bias the diaphragm 51 and the follower 50 to their neutral position and to assist in returning them to said neutral position upon displacement therefrom.

Operation of Fig. 2

Let it be assumed that the reservoir 2 is charged with fluid under pressure and that the valve device 3 is in its neutral position N with the various parts of the valve device 45 positioned as shown in Fig. 2. With the valve device 3 in its neutral position N it will be understood that the chambers 54 and 56 in the fluid pressure actuated valve device 45 will be vented to the atmosphere by way of the cavity 37 of valve element 35. (See Fig. 1.) Upon operation of the handle 36 of valve device 3 in a counterclockwise direction, from neutral position N to position F, fluid under pressure will be supplied to the chamber 54 of valve device 45 while chamber 56 remains connected to atmosphere. As the fluid pressure in chamber 54 builds up, the fold 58 will immediately be deflected in a right-hand direction into hugging engagement with the bead 71 and the part of follower 50 inside said bead, and such part of fold 58 will become effectively immobilized and the diaphragm will behave as if such part were effectively clamped to the follower and the diameter of the follower was coextensive with that of the bead 71. Thus, while fluid under pressure will act on the area of the fold 58 outside the bead 71 and on the area of the follower 50 for moving said follower 50 and rod 59 in a right-hand direction, the diaphragm 51 and follower will have an effective pressure area corresponding to the area of a circle having a diameter substantially equal to the average between the diameter of the bead 71 and the diameter of bores 48, 49.

When the unit fluid pressure active in chamber 54 becomes great enough, the diaphragm 51 will flex and the follower 50 and rod 59 will be moved to cause slide valve 66 to connect pipes 68 and 69 while valve element 62 continues to maintain pipe 25 and 24 disconnected.

Restoration of handle 36 to neutral position N will vent chambers 54 and 56 to atmosphere, as above described, thereby to allow spring 73 to return diaphragm 51 and follower 50 to neutral position N as viewed in Fig. 2. When the follower 50 is returned to neutral position the cavity 67 of slide valve 66 will only be in communication with passage 68 and valve element 62 will maintain pipes 24 and 25 disconnected.

If it is desired to connect the pipes 24 and 25, the handle 36 of valve device 3 is shifted in a clockwise direction, as seen in Fig. 2, from neutral position N to position S whereby fluid under pressure is supplied to chamber 56 while chamber 54 remains vented to the atmosphere.

As the pressure of fluid in chamber 56 builds up, diaphragm 51 will be deflected in the left-hand direction out of engagement with the bead 71 of the follower 50, thereby exposing the entire inside surface area of fold 58 to the pressure of fluid in chamber 56. With this entire area of fold 58 active as a diaphragm, the effective area of the follower 50 will be reduced to that of the clamping nut 60. Hence, while the pressure of fluid in chamber 56 will act over the entire area of fold 58 and over the full area of nut 60 (because chamber 65 is open to chamber 56), the effective pressure area and hence the efficiency of diaphragm 51 and follower assemblage 50, 60 will be less than when the diaphragm is moved in the right-hand direction as previously described. More specifically, the effective pressure area of the diaphragm and follower will correspond to the area of a circle having a diameter substantially equal to the average between the diameter of bores 48 or 49 and the diameter of the follower 50 surrounding the inner peripheral portion 53 of diaphragm 51. With a lesser effective pressure area, a unit fluid pressure higher than that for movement of the diaphragm 51 in a right-hand direction is required to effect movement of the diaphragm in a left-hand direction.

When the unit fluid pressure force becomes great enough, the follower 50 and the rod 59 will be moved in the left-hand direction against the opposing force of spring 72, said rod 59 moving the valve element 62 into the position in which the groove 64 thereof connects pipe 24 with pipe 25 and also moves slide valve 66 so that cavity 67 thereof maintains pipes 68 and 69 disconnected.

If it is desired to terminate the communication between the pipes 24 and 25 the handle 36 of valve device 3 is shifted in a counterclockwise direction, as viewed in Fig. 2, from position S to neutral position N, thereby venting chamber 56 to atmosphere in the manner hereinbefore described. As the pressure of fluid in chamber 56 is reduced to atmospheric pressure, the spring 72 will move the follower 50 and the diaphragm 51 in a right-hand direction to their rest position as viewed in Fig. 2. This movement of follower 50 will carry the rod 59 to its normal position, as viewed in Fig. 2, thereby positioning the valve element 62 so as to disconnect pipes 24 and 25 and also move slide valve 66 into the position as viewed in Fig. 2.

*Summary*

It will therefore be seen that I have provided a novel arrangement for a fluid pressure actuator whereby movement thereof in opposite directions from a neutral position may be effected by different unit fluid pressure differentials due to said novel arrangements changing the effective pressure area of said actuator.

Having now described the invention, what I claim as new and desire to secure by Letters Patent, is:

1. In an actuator having a casing, the combination of a movable abutment subject opposingly to fluid pressures in two chambers in the casing and comprising an annular diaphragm and also circular diaphragm follower means, means for biasing said movable abutment to a neutral position upon equalization of pressures in said chambers, said annular diaphragm having an outer peripheral portion secured in sealed relation to the casing and having an inner peripheral portion secured in sealed relation to said follower means, said diaphragm also having an annular flexible corrugation between the said outer and inner peripheral portions thereof, said corrugation having an inside crown and being in substantially unflexed condition with the movable abutment in its neutral position, annular means arranged coaxially with said movable abutment and carried by said follower means and providing an annular bead disposed in one of said chambers able abutment in the opposite direction from neutral engaging said bead upon movement of said movable abutment in one direction from neutral position responsively to preponderance of fluid pressures in the other of said chambers over that in said one chamber for providing one effective pressure area of said movable abutment, and said annular corrugation and thereby the inside crown of said annular corrugation being deflected out of engagement with said bead upon movement of the movable abutment in the opposite direction from neutral position responsively to preponderance of fluid pressure in said one chamber over that in said other chamber for providing a lesser effective pressure area of the movable abutment, and actuated means operably connected to said follower means so as to perform desired control functions upon such movement of said movable abutment.

2. The combination according to claim 1, wherein said one effective pressure area corresponds to the area of a circle having a diameter which is substantially the average between the diameter of said bead and the outer diameter of said annular corrugation of said diaphragm, and wherein said lesser effective pressure area corresponds to the area of a circle having a diameter which is substantially the average between the outer diameter of said follower means and the outer diameter of said annular corrugation of said diaphragm.

References Cited in the file of this patent

UNITED STATES PATENTS

| Number | Name | Date |
|---|---|---|
| 1,937,314 | Bryant | Nov. 28, 1933 |
| 2,241,056 | Chilton | May 6, 1941 |
| 2,465,714 | Elliott | Mar. 29, 1949 |
| 2,493,449 | Fitch | Jan. 3, 1950 |
| 2,665,711 | Parks | Jan. 12, 1954 |
| 2,718,241 | Newell | Sept. 20, 1955 |

UNITED STATES PATENT OFFICE
CERTIFICATE OF CORRECTION

Patent No. 2,905,199 September 22, 1959

Earle S. Cook

It is hereby certified that error appears in the printed specification of the above numbered patent requiring correction and that the said Letters Patent should read as corrected below.

Column 8, line 5, for "able abutment in the opposite direction from neutral" read -- and projecting toward the inside crown, said inside crown --.

Signed and sealed this 22nd day of March 1960.

(SEAL)
Attest:

KARL H. AXLINE
Attesting Officer

ROBERT C. WATSON
Commissioner of Patents